June 13, 1939. L. D. NILSON Re. 21,112
BUMPER JACK
Original Filed Sept. 10, 1935
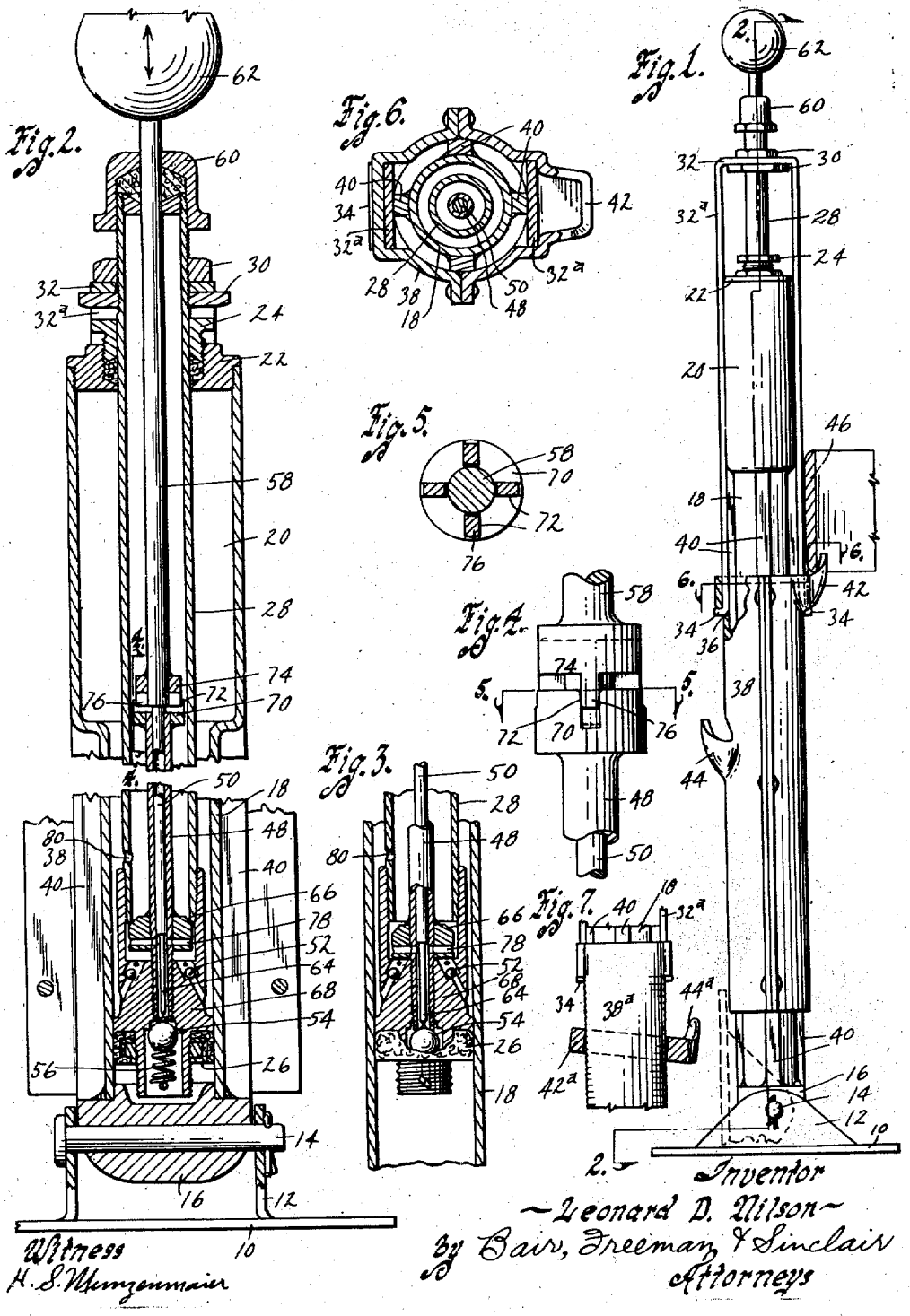
Witness
H. S. Wenzenmaier
Inventor
Leonard D. Nilson
By Bair, Freeman & Sinclair
Attorneys Reissued June 13, 1939 Re. 21,112

UNITED STATES PATENT OFFICE 21,112

BUMPER JACK

Leonard D. Nilson, Wayzata, Minn., assignor to Vulcan Manufacturing Co., Inc., St. Paul, Minn., a corporation of Minnesota Original No. 2,064,445, dated December 15, 1936, Serial No. 39,929, September 10, 1935. Application for reissue March 12, 1938, Serial No. 195,568

10 Claims. (Cl. 254—93)

An object of my invention is to provide a bumper jack which is simple, durable and comparatively inexpensive to manufacture.

More particularly it is my object to provide a jack structure of post-like construction having an operating member extending from one end thereof and reciprocable toward and away from the post-like member, and axially thereof, lifting means being provided which is vertically slidable on the post-like member and has one or more projections for engaging the bumper of an automobile for lifting the bumper and thereby one end of the automobile.

Heretofore jacks have been made which set under the axles of the automobiles and some of these have extension operating means making them more convenient for operating the jack from a convenient position remote from the jack itself. Present day automobiles are constructed with considerable over-hang of the body relative to the axles and it is therefore quite difficult, especially when balloon tires are used and have been punctured, to get a jack properly positioned under the axle and still be able to operate the jack from a comfortable position without getting one's clothes dirty and experiencing other difficulties. My present invention accordingly is designed to eliminate the necessity for placing a jack under the axle, the jack being cooperable with the bumper of the automobile which is always located at the extreme end thereof and the jack being sufficiently powerful to lift either one entire end of the car or one corner thereof as desired.

A further object is to provide operating means for the jack which is in a convenient position for manipulation, specifically, located at the upper end of the post-like jack and vertically reciprocable for the lifting operation without any levers or the like extending laterally from the jack.

A further object is to provide a jack which has a considerable range of movement, one which is readily positioned and only which may be quickly adjusted to the bumper or other projection with which it engages and can thereafter be conveniently operated in a standing position for lifting the bumper.

Another object is to provide the lifting mechanism of the jack in the form of a lifting piston and a hydraulic pump and to provide readily operable release means permitting lowering of the jack without any manipulation thereof, other than opening a release valve.

With these and other objects in view, my invention consists in the construction, arrangement and combination of the various parts of my device, whereby the objects contemplated are attained as hereinafter more fully set forth, pointed out in my claims and illustrated in the accompanying drawing, in which:

Figure 1 is a side elevation of a bumper jack structure embodying my invention and showing it cooperating with a bumper bar.

Figure 2 is an enlarged sectional view on the line 2—2 of Figure 1 showing the lifting means in lowered position.

Figure 3 is a sectional view similar to the lower end of Figure 2 showing the parts in release or lowered position.

Figure 4 is an enlarged elevation of a portion of Figure 2 as viewed on the line 4—4 thereof.

Figure 5 is a sectional view on the line 5—5 of Figure 4; and

Figure 6 is an enlarged sectional view on the line 6—6 of Figure 1.

Figure 7 shows a modified form of load support.

On the accompanying drawing, I have used the reference numeral 10 to indicate a base or foot for my jack structure. It is provided with up struck perforated ears 12 through which a pivot pin 14 extends. The pin also extends through a lower cylinder head 16 of a lifting cylinder 18. The lifting cylinder 18 is enlarged at its upper end to form a reservoir 20 and the upper end is provided with a head 22 and a packing nut 24.

Within the lifting cylinder 18 I provide a cup leather lifting piston 26 connected with a tubular lifting piston rod 28. The upper end of the rod 28 extends through the packing nut 24 and is connected by lock nuts 30 to a yoke 32. The arms of the yoke indicated at 32*a* extend downwardly outside the reservoir 20 and are hooked at their lower ends as indicated at 34. The hooks enter slots 36 of a tubular lifting member 38 whereby raising movement of the lifting piston 26 and its rod 28 will raise the yoke 32 and consequently the lifting member 38.

The internal diameter of the member 38 is substantially the same as the exterior diameter of the reservoir 20 to provide a sliding telescoping connection between these two members. Below the reservoir 20 the lifting cylinder 18 is provided with a plurality of guide strips 40 which provide a four point guide as shown in Figure 6 for the entire tubular lifting member 38 or for the portion thereof extending below the reservoir.

The lifting member 38 is provided with a pair of hook-like projections 42 and 44. One of these is adapted to engage a bumper bar 46 of an automobile or any other device to be raised by the jack structure.

From the foregoing description, it will be obvious that the lifting member 38 can be raised by operating the lifting piston 26 and this is accomplished by pumping oil from the reservoir 20 and the space in the cylinder 18 above the piston 26 to the space in the cylinder below the piston. For this purpose, I provide a pump comprising a pump cylinder 48, a plunger rod 50, intake valves 52 and an outlet valve 54. The intake valves are gravity seated while the outlet valve is seated by a spring 56. The plunger 50 has an enlarged rod-like extension or operating rod 58 to provide sufficient strength to prevent bending, the plunger itself being quite small to secure the required differential of diameter between the pump plunger 50 and the lifting piston 26.

The upper end of the operating rod extends from the upper end of the tubular lifting piston 28 through a packing nut 60 and terminates in an operating knob 62. Upon reciprocation of the knob 62 upwardly, oil will be drawn from the reservoir 20, through the check valves 52 into the pump cylinder 48. On the down stroke, this oil will be forced through the outlet check valve 54 and raise the lifting piston a distance corresponding to the volume of oil pumped through the valve 54. Thus by a number of reciprocations the bumper 46 will be raised step by step.

With the jack structure in the lowered position, it is first placed adjacent the bumper and the yoke 32 then grasped and pulled upwardly which causes flow of oil through the check valves 52 and 54 so that the jack may be quickly raised by hand to contact with the bumper. Thereafter the jack may be pumped up for the lifting operation. This eliminates the tedious operation of pumping to bring the jack up from its lowered position to bumper contacting position and enables the operator to raise it to this position in a minimum of time.

After the jack is raised, it will stay in raised position, the valves check 52 and 54 holding the oil against return movement. Such return movement is required for lowering the jack and may be accomplished by releasing means which I will now describe:

Means is provided for by-passing the return oil past the valves 52 instead of unseating them and comprises a valve plug 66 secured to the pump cylinder 48. This plug normally seats as in Figure 2 against the lower end of the tubular piston rod 28 so as to prevent any oil leakage past this point.

The lower end of the pump cylinder 48, it will be noted, is threaded in a fitting 68 which connects the lower end of the tubular piston rod 28 with the lifting piston 26.

The upper end of the pump cylinder 48 is provided with a head 70 having a plurality of notches 72. The operating rod 58 is provided with a head 74 having a plurality of lugs 76 adapted to enter the notches 72 when the rod 58 is adjacent its innermost position as shown in Figure 2.

Thereupon the knob 62 can be rotated for rotating the cylinder 48 and causing it to move longitudinally downward as in Figure 3 to open the valve plug 66 and to engage and open the valve 54. The oil may thereupon flow past the valve 54 and enter the bore of the cylinder 48 through notches in the lower end thereof, and then through passages 78 (see Figure 3) and past the valve 66 and through an opening 80 to the cylinder 18 above the piston 26 and to the reservoir 20.

By this arrangement the single knob 62 serves both as a lifting means and as a lowering means by reciprocations and rotations respectively. The speed of lowering, of course, can be nicely governed by the degree of opening of the valves 54 and 56.

After the valve 54 is off its seat, the lugs 76 of the head 74 will be meshed deeper with the notches 72 causing a pin-like extension 64 on the lower end of the piston rod 50 to move the valve 54 further from its seat. This cannot be done while the valve 54 is on its seat due to the pressure of oil holding the valve against its seat, but after the valve is unseated the pressure is equalized, thereby permitting a downward movement of the knob 62 to open the valve further for quick lowering without exerting undue effort to push the valve further open.

In Figure 7 I show a modified construction in which a sleeve 38*a* is substituted for the sleeve 38 and has a movable ring 42*a* provided with a lug 44*a*, thus providing an adjustable hook on the lifting sleeve 38*a*. The surface of the sleeve 38*a* is preferably slightly corrugated so as to aid in the binding action of the ring 42*a* on the sleeve after the ring is adjusted to the desired height thereon.

It will be noted that all operating parts of the jack are in a straight line. This produces compactness without any projecting operating parts to be interfered with by parts of the automobile, inasmuch as parts above the bumpers of automobiles are always clear. Likewise, the absence of particularly an operating handle projecting laterally from the postlike jack makes the jack less bulky to place in a tool box after use.

The elongated arrangement of the jack permits a considerable range of movement, the piston 26 being movable from adjacent the head 16 to adjacent the bottom of the reservoir 20. By enlarging the cylinder 18 to form the reservoir 20 the upper end of the cylinder 18 can be extended to the maximum height yet provide sufficient capacity in the reservoir for displacement caused by the tubular piston rod 28. The guide strips 40 effectively guide the tubular lifting member 38 in its lower positions, the upper end thereof being finally guided by the reservoir 20 and capable of extending to a position partially thereabove when the jack is in its extreme raised position. The foot, being pivoted, can be swung to the dotted position of Figure 1 when storing the jack in the tool box so as to thus further reduce the room required for storing the jack to a minimum.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a bumper jack, a vertical cylinder, bumper engaging means slidable thereon and having means for supporting a bumper, lifting means within said cylinder and having a portion projecting above the upper end thereof, an operative connection between said portion and said bumper engaging means to raise the bumper engaging means when the lifting means is operated, operating means for said lifting means having a vertically reciprocable stem extending out of the upper end of said portion, a handle thereon, screw threaded means to release said lifting means to permit lowering thereof, said handle and stem, in their lowermost position, being manipulatable to rotate said screw threaded means and thereby operate said release means.

2. In a bumper jack, a vertical cylinder, bumper engaging means slidable thereon and having means for supporting a bumper, a lifting piston within said cylinder and having a piston rod projecting above the upper end thereof, an operative connection between said portion and said bumper engaging means to raise the means when oil is pumped to the lifting piston and a pump within said piston rod for so pumping oil, said pump having an operating rod extending from the upper end of said piston rod, release means for said lifting piston, said operating rod being connectible therewith when the rod is in its lowermost position to operate the release means when it is desired to permit the jack to lower.

3. In a jack of the character described, a vertical cylinder, a lifting member slidable longitudinally relative thereto, lifting means within said cylinder, said lifting means comprising a lifting piston, a tubular piston rod extending upwardly therefrom and from the upper end of said cylinder, an operative connection between the upper end of said tubular piston rod and said lifting member, a pump within said tubular piston rod for pumping oil from the cylinder above the lifting piston to the cylinder below the lifting piston and an operating member for said pump extending slidably from the upper end of said tubular piston rod and guided slidably thereby, said operating member being substantially within the extended outline of said lifting member.

4. In a jack of the character described, a vertical cylinder, a lifting member slidable longitudinally relative thereto, lifting means within said cylinder, said lifting means comprising a lifting piston, a tubular piston rod extending upwardly therefrom and from the upper end of said cylinder, the lower end of said tubular piston rod and the space in said cylinder above said piston constituting a reservoir, an operative connection between the upper end of said tubular piston rod and said lifting member, a pump within said tubular piston rod for pumping oil from said reservoir above the lifting piston to the cylinder below the lifting piston and an operating member for said pump extending from the upper end of said tubular piston rod, comprising a pump piston rod and a knob on the upper end thereof and packing between said piston rods to seal one relative to the other.

5. In a jack of the character described, a vertical cylinder, a lifting member slidable longitudinally relative thereto, lifting means within said cylinder, said lifting means comprising a lifting piston, a tubular piston rod extending upwardly therefrom and out of the upper end of said cylinder, an operative connection between the upper end of said tubular piston rod and said lifting member, a pump within said tubular piston rod for pumping oil from the cylinder above the lifting piston to the cylinder below the lifting piston, an operating member for said pump extending from the upper end of said tubular piston rod, said pump including release means to permit oil to flow from below the lifting piston to thereabove and means to render said release means operative by coaction of said operating member therewith in the lowermost position of the operating member.

6. In a device of the class described, a vertical cylinder having an enlarged reservoir portion at its upper end, guide means below said reservoir portion of substantially the same diameter as the outside diameter of said reservoir portion, a tubular lifting member vertically slidable on said guide means and reservoir portion, lifting means within said cylinder comprising a lifting piston, a tubular piston rod extending upwardly at one end from the upper end of said cylinder, an operative connection between the upper end of said tubular piston rod and said lifting member, a pump within said tubular piston rod for pumping oil from the reservoir cylinder above the lifting piston to the cylinder below the lifting piston and an operating member for said pump extending from the upper end of said tubular piston rod.

7. In a jack of the character described, a vertical cylinder, a lifting member slidable longitudinally relative thereto, lifting means within said cylinder, said lifting means comprising a lifting piston, a tubular piston rod extending upwardly therefrom and from the upper end of said cylinder, an operative connection between the upper end of said cylinder, an operative connection between the upper end of said tubular piston rod and said lifting member, a pump within said tubular piston rod for pumping oil from the cylinder above the lifting piston to the cylinder below the lifting piston, an operating member and release means for said pump extending from the upper end of said tubular piston rod, and a coupling connection between said pump piston rod and said release means, the release means being operated upon rotation, said coupling connection being operative by said pump piston rod only at one limit of its reciprocatory movement.

8. In a jack of the character described, a vertical cylinder, a lifting member slidable longitudinally relative thereto, lifting means within said cylinder, said lifting means comprising a lifting piston, a tubular piston rod extending upwardly therefrom and from the upper end of said cylinder, an operative connection between the upper end of said tubular piston rod and said lifting member, a pump within said tubular piston rod for pumping oil from the cylinder above the lifting piston to the cylinder below the lifting piston, an operating member for said pump extending from the upper end of said tubular piston rod and comprising a pump piston rod and knob on the upper end thereof, said pump including valve means to permit, when open, oil to flow from below the lifting piston to thereabove, screw threaded means to open said valve means and means operable from said operating member to operate said screw threaded means.

9. In a jack of the character described, a vertical cylinder, a lifting member slidable longitudinally relative thereto, hydraulic lifting means within said cylinder and projecting thereabove, an operative connection between the projecting part thereof and said lifting member and pump means for lifting and lowering said lifting means and having a piston rod projecting from said projecting part, said piston rod being movable one way for lifting operations and movable a different way for lowering operations at one limit only of its movement the first way.

10. In a jack structure of the character described, a vertical support, a lifting sleeve slidable longitudinally relative thereto, hydraulic lifting means for said lifting sleeve, lowering means for said lifting means, an operative connection between said lifting means and said lifting sleeve, means for operating said lifting means and having a handle projecting above said lifting sleeve and means exterior of said jack structure for operating said lowering means, said handle being operable by reciprocation along the vertical axis of said jack structure and being substantially within the extended outline thereof.

LEONARD D. NILSON.